United States Patent
Keen, Jr.

[11] 3,883,680
[45] May 13, 1975

[54] HIGH VOLTAGE ELECTRICAL BUSHING INCORPORATING A CENTRAL CONDUCTOR EXPANDABLE EXPANSION CHAMBER

[75] Inventor: William A. Keen, Jr., Cheshire, Mass.

[73] Assignee: General Electric Company

[22] Filed: Jan. 18, 1974

[21] Appl. No.: 434,386

[52] U.S. Cl. .......................... 174/12 BH; 174/31 R
[51] Int. Cl. ..................... H01b 17/26; H01b 17/34
[58] Field of Search ...... 174/11 BH, 12 BH, 14 BH, 174/15 BH, 16 BH, 18, 31 R, 142, 143, 152 R, 153 R

[56] References Cited
FOREIGN PATENTS OR APPLICATIONS
512,217  4/1955  Canada .......................... 174/12 BH
367,615  1/1923  Germany ......................... 174/12 BH Primary Examiner—Laramie E. Askin
Attorney, Agent, or Firm—John J. Kelleher

[57] ABSTRACT

An expandable expansion chamber, for dielectric fluid whose volume is temperature dependent, is contained in the hollow portion of the hollow central conductor of a high voltage electrical bushing. Dielectric fluid completely surrounding the central conductor completely fills the void between the hollow central conductor and the external housing of said electrical bushing, as well as the expandable expansion chamber inside said hollow central conductor. Expanding dielectric fluid moves through an opening in the hollow central conductor into said expansion chamber causing the expandable expansion chamber to increase its volume as it contains the temperature produced increased volume of dielectric fluid.

15 Claims, 5 Drawing Figures

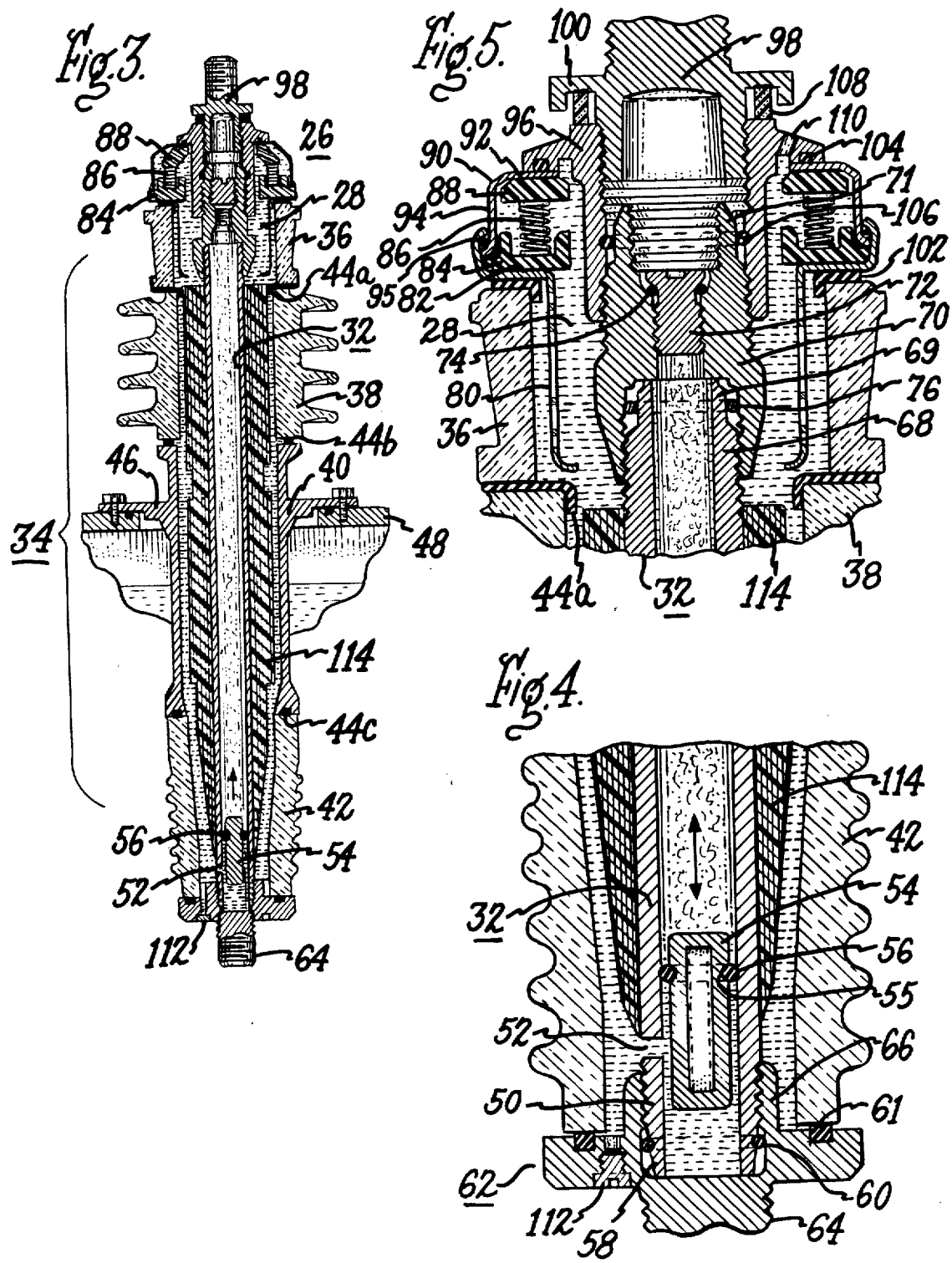

HIGH VOLTAGE ELECTRICAL BUSHING INCORPORATING A CENTRAL CONDUCTOR EXPANDABLE EXPANSION CHAMBER

BACKGROUND OF THE INVENTION

My invention relates generally to high voltage electrical bushings and more particularly to a new and improved high voltage bushing of the type having a hollow central conductor surrounded by a dielectric fluid, said dielectric fluid having a temperature dependent volume.

An illustration of a high voltage electrical bushing found in the prior art of the type having a dielectric fluid completely surrounding a hollow central conductor is shown in FIG. 1. In this type of electrical bushing 12 dielectric fluid 14 only partly fills the void between tubular central conductor 16 and hollow external housing 18 as can be seen through sight glass 20 where a compressible gas 22 is shown occupying the space immediately above dielectric fluid 14, said compressible gas 22 occupied space functioning as an expansion chamber. In bushings of the bushing 12 type, the hollow portion of tubular central conductor 16 normally contains only the air that has entered same during manufacture. If the temperature of bushing 12 changes such that dielectric fluid 14 expands, the increased volume of dielectric fluid 14 will expand into the expansion chamber above dielectric fluid 14 causing said gas 22 to be compressed. Conversely a temperature change causing dielectric fluid 12 to decrease in volume will result in an increase in gas 22 volume and an attendant decrease in gas 22 pressure.

One major disadvantage of electrical bushing 12 having this type of expansion chamber is that bushing 12 cannot be installed in a horizontal or near horizontal position. If such a bushing 12 were so installed the gas located in what was formerly the uppermost portion of bushing 12 would move to the subsequent uppermost region between the tubular central conductor 16 and external housing 18 significantly reducing the electrical insulation in said region. In a bushing, such as the one illustrated in FIG. 1, a permeable material or kraft paper 24 is immersed in dielectric fluid 14, said kraft paper 24 being wrapped around the tubular central conductor 16 to form a combination kraft paper/dielectric fluid electrical insulation barrier. In the horizontal position dielectric fluid 14 would drain from kraft paper 24 which would also result in a significant reduction in electrical insulation between the tubular central conductor 16 and external housing 18 in the region from which said dielectric 14 would drain.

Another disadvantage inherent in electrical bushing 12 is that when compressible gas 22 comes in contact with dielectric fluid 14, said gas 22 partly dissolves in dielectric fluid 14 causing a diminution in the electrical insulating qualities of said dielectric fluid 14.

Still another disadvantage is found in the heat transfer characteristics of electrical bushing 12. The fact that the upper portion of the void between tubular central conductor 16 and external housing 18 must contain a compressible gas 22 to allow for dielectric fluid 14 expansion results in a less efficient heat flow from the tubular central conductor 16 to external housing 18 in said upper portion than an arrangement where dielectric fluid 14 completely fills the space occupied by compressible gas 22. This disadvantage is due to the fact that gas 22 is a poorer conductor of heat than dielectric fluid 14.

A primary object of my invention is to provide a high voltage electric bushing capable of being mounted horizontally without reducing the electrical insulating capability of the dielectric fluid contained between the hollow central conductor and the hollow external housing of said electrical bushing.

It is another object of my invention to provide a high voltage electrical bushing, of the type containing a dielectric fluid whose volume is temperature dependent, that will avoid the necessity of said dielectric fluid contacting a compressible gas that may degrade the electric insulting characteristics of said dielectric fluid.

It is a further object of my invention to provide a high voltage electrical bushing, of the type containing a dielectric fluid whose volume is temperature dependent, that has improved heat transfer characteristics.

SUMMARY OF THE INVENTION

In carrying out this invention and one preferred embodiment thereof a high voltage electrical bushing, of the type having a tubular central conductor surrounded by a dielectric fluid whose volume is temperature dependent, utilizes the space inside said hollow central conductor for a dielectric fluid expansion chamber. Dielectric fluid completely fills the void between said hollow central conductor and the external housing of the electric bushing as well as the expansion chamber in the tubular central conductor. Thermally expanding dielectric fluid moves through an opening into said expansion chamber, said expansion chamber being of the expandable type, causing the expansion chamber to increase its volume thereby accommodating the increased volume of dielectric fluid.

The invention which is sought to be protected will be particularly pointed out and distinctly claimed in the claims appended thereto. However, it is believed that this invention and the manner in which its objects and advantages are obtained, as well as other objects and advantages thereof, will be more readily understood by reference to the following detailed description of the preferred embodiment thereof, particularly when considered in light of the accompanying drawings.

BRIEF DESCRIPTION OF THE DRAWINGS

FIG. 3 is a cross-sectional view taken on a plane passing through the longitudinal axis of a high voltage bushing incorporating the expandable expansion chamber of the present invention.

FIG. 4 is an enlarged detail of the expandable expansion chamber end of the high voltage bushing of the present invention.

FIG. 5 is an enlarged detail of the sight glass end of the high voltage bushing of the present invention.

DESCRIPTION OF THE PREFERRED EMBODIMENT

Figure 1:
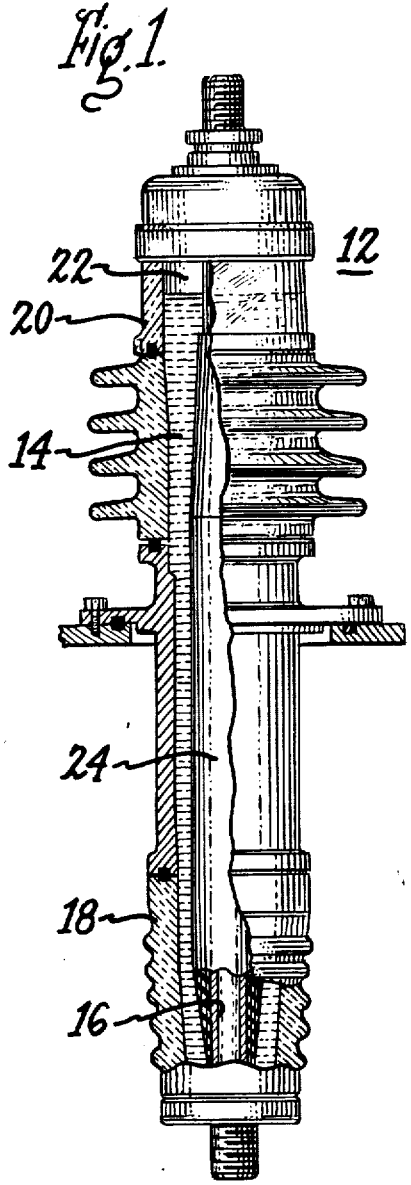
FIG. 1 is a side elevation, partly in section, of a prior art vertically installed high voltage bushing showing the sight glass/expansion chamber portion of said high voltage bushing containing both a dielectric fluid and a compressible gas.

As previously stated, FIG. 1 illustrates a type of prior art high voltage bushing utilized in vertical or near vertical bushing installation for handling voltages in the same range as the voltages handled by high voltage electrical bushings incorporating my invention.

Figure 2:
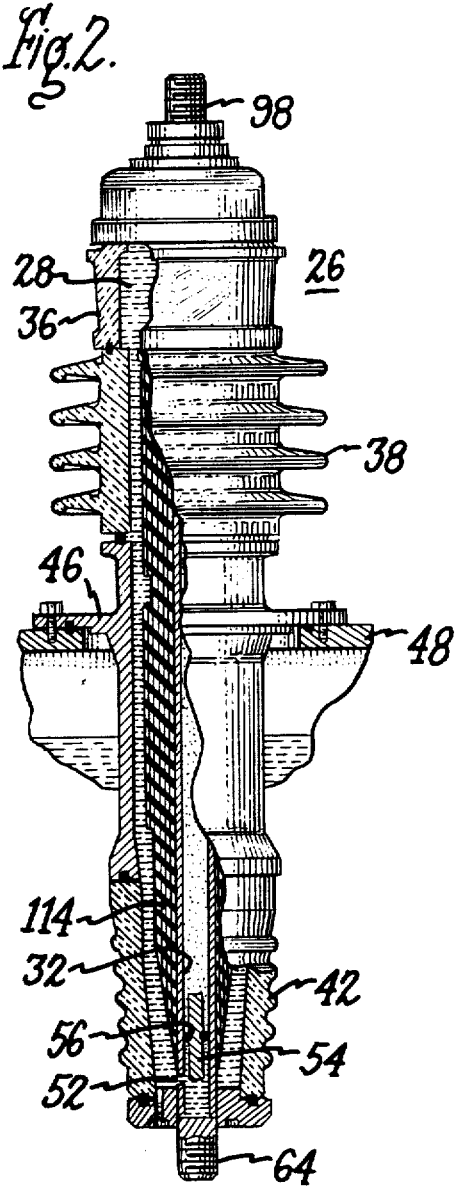
FIG. 2 is a side elevation, partly in section, of a high voltage bushing showing both the sight glass/former expansion chamber and the tubular central conductor expansion chamber of the present invention, completely filled with dielectric fluid.

Referring now to the drawings and the preferred embodiment thereof, where like numerals are used to indicate like parts throughout, in FIG. 2 a high voltage electrical bushing 26 incorporating my invention is illustrated. The bushing illustrated in FIG. 2 has the same outward appearance as the prior art bushing illustrated in FIG. 1 except that dielectric fluid 28 in FIG. 2, visible through sight glass 36, completely fills said sight glass 36 in contrast to sight glass 20 in FIG. 1 which is only partly filled by dielectric fluid 14. For a detailed description of high voltage bushing 26 reference should here be made to FIG. 3 where a cross-sectional view taken along a plane containing the longitudinal axis of bushing 26, incorporating my invention, is illustrated. In this preferred embodiment tubular central conductor 32, of circular cross-section, extends through the hollow center portion of external housing 34, said external housing 34 consisting of four hollow and circular sections. From top to bottom, in FIG. 3, the four sections are: sight glass 36, outer porcelain shell 38, aluminum support shell 40, and inner porcelain shell 42 respectively. Circular gaskets 44a, 44b and 44c are interposed betwen adjacent external housing sections 36, 38, 40, and 42 to form dielectric fluid-tight seals between these adjacent sections. Aluminum support shell 40 has apertured flange 46 extending laterally therefrom for the purpose of mounting said support shell 40 to structure 48, said structure 48 containing the electrical apparatus with which said bushing 26 is to be utilized. Outer porcelain insulator section 38 electrially insulates the high potential outer end of tubular central conductor 32 from ground potential, represented by structure 48, and likewise inner porcelain insulator section 42 electrically insulates the inner end of tubular central conductor 32 from the same ground potential. Sight glass 36 enables one to observe the level of dielectric fluid 28 inside bushing 26. A more detailed illustration of the inner and outer end portions of bushings 26 is contained in FIGS. 4 and 5.

Reference should here be made to FIG. 4 which is an enlarged detail of the end of bushing 26 opposite the sight glass 36 end illustrated in FIG. 3, hereinafter called the expansion chamber end. Tubular central conductor 32 is illustrated having external threads 50 near an end thereof and having opening 52 extending into the hollow central portion of tubular central conductor 32. Piston 54, cylindrical in shape, has a circular groove 55 of constant semi-circular cross section around the lateral surface of said piston 54 in a plane generally orthogonal to the longitudianl axis of said piston 54. O-ring sealing member 56, made of resilient nitrile rubber, is placed over piston 54 and into said semicircular groove 55 in said piston 54. With this arrangement O-ring sealing member is restrained from moving longitudinally of piston 54. The combination of piston 54 and O-ring 56 is inserted into the hollow center portion of conductor 32 at the expansion chamber end thereof. The length of piston 54 and the positioning of groove 55 is such that when said piston 54 has been inserted in the hollow portion of said conductor 32 to the point where the outer most end of said piston 54 is even or flush with the expansion chamber end of conductor 32, opening 52 is intermediate of O-ring sealing member 56 and the expansion chamber end of said tubular conductor 32. Tubular conductor 32 has a non-threaded tubular end portion 58 extending beyond the threaded portion 50 of said tubular conductor 32. O-ring sealing member 60 is placed over said non-threaded end portion 58 of conductor 32 and in addition a circular gasket 61 is placed adjacent the free end of inner porcelain shell 42, concentric with the longitudinal axis of said inner porcelain shell 42. Inner terminal 62, having an externally threaded portion 64 for attaching said inner terminal 62 to an electrical conductor (not shown), has an internally threaded portion 66, the same thread size as threads 50 near the expansion chamber end of conductor 32. Internally threaded portion 66 of inner terminal 62 is threaded onto threaded portion 50 of tubular central conductor 32. When inner terminal 62 is fully threaded onto hollow central conductor 32, O-ring sealing member 60 forms a fluid-tight seal between cental conductor 32 and inner terminal 62 and at the same time circular gasket 61 forms a fluid-tight seal between inner porcelain shell 42 and inner terminal 62. With this arrangement, and the fact that piston 54 is capable of being moved away from inner terminal 62, an expandable expansion chamber is formed by the inner walls of tubular central conductor 32, the combination of piston 54 and O-ring sealing member 56 and the combination of inner terminal 62, O-ring sealing member 60 and the non-threaded end 58 of tubular central conductor 32. Opening 52 permits movement of fluid into and out of said expandable expansion chamber.

Reference should here be made to FIG. 5 which is an enlarged detail of the sight glass 36 end of bushing 26 illustrated in FIG. 3. Tubular central conductor 32 is shown having external threads 68 near the sight glass end thereof and having a non-threaded end portion 69 extending beyond the threaded portion 68 of said tubular central conductor 32. Core rod adapter 70, generally cylindrical and hollow in shape, has internal threads at each end thereof, one end being of large diameter than the other. In addition, core rod adapter 70 has external threads near the smaller diameter end and a non-threaded external end portion 71 between said external threads and the smaller diameter end of said core rod adapter 70. A removable gas-fill plug 72 is incorporated inside core rod adapter 70, said gas-fill plug 72 is incorporated inside core rod adapter 70, said gas-fill plug 72 being provided with an O-ring sealing member 74 to prevent gas from leaking past said removable gas-fill plug 72. O-ring sealing member 76 is placed over the non-threaded end portion 69 of hollow central conductor 32 and then the internally threaded larger diameter end of core rod adapter 70 is fully threaded onto the externally threaded end portion 68 of tubular central conductor 32. With this arrangement, a fluid-tight seal is provided between core rod adapter 70 and tubular central conductor 32 and a sealable opening is provided inside core rod adapter 70 for introducing gas into the hollow central portion of tubular central conductor 32.

A bushing cover assembly partly encloses the sight glass end of bushing 26. The constituent parts of this bushing cover assembly will now be described. Cylindrical terminal shield 80 has flange portion 82 extending laterally therefrom and the end of said flange 82 extends parallel to and away from said cylindrical terminal shield 80. Ring-shaped spring housing 84, having a circular trough around one side thereof, has its non-trough side placed against the side of flange 82 such that the external edge of said ring-shaped housing 84 engages the parallel extending end of flange 82. Helical springs 86, having their longitudinal axes oriented perpendicular to a side of ring-shaped spring housing 84 are equally spaced around the circular trough portion of said ring-shaped spring housing 84. A central opening through ring-shaped spring retainer 88, having upper and lower side portions, has a central opening that is first aligned with the analogous central opening through ring-shaped spring housing 84 and then the lower side portion of said ring-shaped spring retainer 88 is made to engage the free ends of the helical springs 86 that are equally spaced around ring-shaped spring housing 84. Circular cup-shaped metal diaphragm 90, having a bottom portion 92 and a side portion 94, is inverted and is then placed over said ring-shaped spring retainer 88 such that the inside bottom portion 92 of said cup-shaped diaphragm 90 engages the upper side portion of ring-shaped spring retainer 88 and the free end of the side portion 94 of said cup-shaped diaphragm 90 engages the parallel extending end of flange 82. O-ring sealing member 95 provides a fluid-tight seal between diaphragm 90 and the parallel extending end of flange 82. Terminal shield 80, ring-shaped spring housing 84, helical springs 86, ring-shaped spring retainer 88 and cup-shaped metal diaphragm 90 constitute the bushing cover assembly.

Clamping nut 96, hollow and generally cylindrical in shape, has internal threads at both ends and additionally has a laterally extending flange at one end. The internal threads on the non-flange end of clamping nut 96 are the same size as the external threads on core rod adapter 70. Outer terminal 98, generally cylindrical in shape, having external threads on both ends, has a laterally extending flange 100 intermediate of the threaded ends of said outer terminal 98. One threaded end of said outer terminal 98 is threadable into the internally threaded flange end of clamping nut 96. The remaining threaded end of outer terminal 98 is for the purpose of attaching said outer terminal 98 to an electrical conductor (not shown).

To complete the assembly of the sight glass end of bushing 26, circular gasket 102 of L-shaped cross section is placed on the free end of sight glass 36 and then the bushing cover asembly, having the longitudinal axis of terminal shield 80 aligned with the longitudinal axis of tubular central conductor 32, is placed around core rod adapter 70 such that the laterally extending flange 82 on terminal shield 80 engages gasket 102 on the free end of sight glass 36. O-ring gasket 104 is placed adjacent the outer surface of the bottom portion 92 of cup-shaped diaphragm 90. An O-ring sealing member 106 is placed over the non-threaded end portion of core rod adapter 70 extending beyond the externally threaded portion of said core rod adapter 70. The non-flange end of clamping nut 96 is fully threaded onto the externally threaded portion of core rod adapter 70. With this arrangement, fluid-tight seals are formed between the flange portions of clamping nut 96 and cup-shaped diaphragm 90, as well as between core rod adapter 70 and tubular central conductor 32. With the expansion chamber end of tubular central conductor 32 attached to inner terminal 62 (FIG. 4), the tightening of clamping nut 96 on core rod adapter 70 places said core rod adapter 70 and tubular central conductor 32 in tension and at the same time places the bushing cover assembly in compression. Flat circular resilent washer 108 is placed on the flange end of clamping nut 96 and then outer terminal 98 is fully threaded into the internally threaded flange end of clamping nut 96 causing flange 100 on outer terminal 98 to engage washer 108, leaving the outwardly extending remaining threaded end of outer terminal 98 available for connection to an electrical conductor (not shown).

Clamping nut 96 has a sealable dielectric fluid fill opening 110 extending therethrough. In order to fill bushing 26 with dielectric fluid, outer terminal 98 and gas-fill plug 72 are removed and then a cylindrical rod (not shown) is inserted into the hollow central portion of tubular central conductor 32 to hold piston 54 (FIG. 4) at the extreme expansion chamber end of tubular central conductor 32. Dielectric fluid 28 is introduced into fill opening 110 until the void between the hollow central conductor 32 and the external housing of bushing 26 as well as the expandable expansion chamber (FIG. 4), said expandable expansion chamber being held to its minimum volume position, is completely filled with dielectric fluid 28. The time required to fill bushing 26 with dielectric fluid can be greatly reduced by removing drain plug 112 (FIG. 4) when filling said bushing 26. Dielectric fluid fill opening 110 is then sealed and the cylindrical rod (not shown) is completely removed from bushing 26. An inert gas, such as nitrogen at (0) PSIG, is introduced into the hollow central portion of tubular central conductor 32 between O-ring 56 on piston 54 (FIG. 4) and the sight glass end of said tubular central conductor 32. Gas fill plug 72 and outer terminal 98 are then reinstalled on bushing 26.

It is normal practice in a high voltage bushing, such as the one described in the preferred embodiment, to wrap the hollow central conductor with a liquid permeable material, sauch as kraft paper, to both improve the electrical insulation around the hollow central conductor and reduce the volume of dielectric fluid required to fill the high voltage bushing. FIG. 3 shows a cross-sectional view of kraft paper 114 wrapped around hollow central conductor 32. Reducing the required amount of thermally expandable dielectric fluid 28, reduces the size of the expansion chamber required to contain thermally expanding dielectric fluid 28.

There is thus described a novel high voltage electrical bushing that can be installed horizontally or near horizontally without degrading the electrical insulating characteristics of said bushing, that isolates the dielectric fluid contained therein from potentially contaminating gases, and that has improved heat transfer characteristics.

GENERAL CONSIDERATIONS

Although central conductor 32 in the preferred embodiment is by choice of circular cross-section, it may, in particular situations, be necessary to have a hollow central conductor of oval or some other geometrical shape. If non-circular cross-sectional shapes are required, the movable piston inside the hollow central conductor must conform to the cross-sectional shape of the hollow central conductor with which it is used.

the term "hollow insulating housing" used herein denotes a housing that is made either entirely or partly of insulating material. The housing described in bushing 26 of the preferred embodiment has an external housing made partly of electrical insulating material and partly of electrically conducting material. In addition to external housing 34 in the preferred embodiment, the term hollow insulating housing includes the structure at each end of bushing 26 that retains dielectric fluid 28 inside said bushing 26 and maintains hollow central conductor 32 in a fixed relation with respect to the remainder of bushing 26 structure.

Electrical apparatus used in conjunction with electrical bushings of the type herein described are usually located inside closed containers. This being the case, the terms "inner" and "outer" used herein are in lieu of the terms "upper" and "lower" respectively, and are used to designate portions of said bushings that will either be inside or outside such closed containers.

The term "dielectric fluid" used herein includes both a dielectric liquid and a dielectric gas. While it is true that it is normal practice to use a liquid dielectric as an insulating medium between tubular central conductor 32 and the external housing of bushing 26 in electrical high voltage bushings of the type herein described, there may be applications where it would be preferable to use a dielectric gas in lieu of a dielectric fluid and my invention is suitable for such an application.

Opening 52 in the preferred embodiment is circular in shape and has its central axis generally orthogonal to the longitudinal axis of tubular central conductor 32. However, design requirements might necessitate a plurality of circular or other shaped openings with their central axis at various angles with respect to the longitudinal axis of hollow central conductor 32. These variations in the design of openings into the expandable expansion chamber inside hollow central conductor 32 are within the scope of my invention.

It is to be understood that in carrying out my invention, more than one movable piston may be utilized inside tubular central conductor 32. In such an arrangement, the movable pistons would be positioned intermediate of the ends of said tubular central conductor 32 leaving enough space for piston movement between each piston and the end of tubular central conductor 32 towards which the aforementioned pistons will move when dielectric fluid 28 expands in the expandable expansion chamber. Dielectric fluid opening 52 would then be located intermediate of said movable pistons.

Although the position of circular groove 55 on piston 54 is preferably orthogonal to the longitudinal axis of said piston 54, an acceptable fluid-tight seal between piston 54 and the internal wall of tubular central conductor 32 can be maintained by utilizing a groove whose angular position deviates a minor number of degrees from the aforementioned orthogonal position of said groove 55.

It will be apparent to those skilled in the art from the foregoing description of the invention that various improvements and modifications can be made in it without departing from the true scope of my invention. Accordingly, it is my intention to encompass within the scope of the appended claims, the true limits and spirit of my invention.

What is claimed is:

1. An electrical bushing assembly of the type having,
    a hollow insulating housing,
    an elongated hollow conductor extending through the hollow portion of said hollow insulating housing,
    a dielectric fluid inside said hollow insulating housing completely surrounding said elongated hollow conductor, said dielectric fluid having a temperature dependent volume;
    wherein the improvement comprises:
        a. a dielectric fluid-containing chamber, inside said elongated hollow conductor, having at least two fluid barriers, at least one of which is movable to vary the volume of said dielectric fluid-containing chamber; and
        b. an opening into said dielectric fluid-containing chamber that allows movement of said dielectric fluid into and out of said dielectric fluid-containing chamber in response to thermal expansion and contraction of said dielectric fluid.

2. An electrical bushing assembly of the type defined in claim 1 wherein said opening into said expandable expansion chamber is circular in shape.

3. An electrical bushing assembly of the type defined in claim 2 wherein the longitudinal axis of said opening is orthogonal to the longitudinal axis of said elongated hollow conductor.

4. an electrical bushing assembly of the type defined in claim 1 wherein the movable fluid barrier inside said elongated hollow conductor comprises:
    a. a movable piston, having an external surface that conforms to the shape of the internal surface of said elongated hollow conductor, said movable piston incorporating a groove extending completely around said conforming external piston surface; and
    b. sealing means, whose shape conforms to said groove in said movable piston, located in said groove in said movalbe piston, said sealing means being engaged with said groove portion of said piston and with the inside surface of said elongated hollow conductor forming a movable fluid-tight seal there-between.

5. An electrical bushing assembly of the type defined in claim 4 wherein the elongated hollow conductor is of circular cross-section.

6. An electrical bushing assembly of the type defined in claim 5 wherein said movable piston is cylindrical in shape and said groove around the external surface of said movable piston is circular and of constant semicircular cross section.

7. An electrical bushing assembly of the type defined in claim 6 wherein a plane containing said groove around the external surface of said movable piston is orthogonal to the longitudinal axis of said movable piston.

8. An electrical bushing assembly of the type defined in claim 6 wherein said sealing means located in said groove around the external surface of said movable piston is of the O-ring type.

9. An electrical bushing assembly of the type defined in claim 8 wherein said O-ring type sealing means is made of resilient nitrile rubber.

10. An electrical bushing assembly of the type having,
    a cylindrically shaped hollow insulating housing having electrically conducting and electrically nonconducting cylindrical portions and having the longitudinal axes of said cyllindrical housing portions concentrically aligned with each other;

an elongated electrical conductor, of circular cross-section, having a hollow central portion, said conductor extending through the hollow portion of said hollow insulating housing, said conductor being in a fixed relation to said cylindrically shaped hollow insulating housing;

a dielectric fluid inside said hollow insulating housing completely surrounding said conductor, said dielectric fluid having a temperature dependent volume;

wherein, the improvement comprises:
   a. a cylindrically shaped piston, having a groove completely around its external cylindrical surface in a plane generally orthogonal to the longitudinal axis of said piston, said piston being inside said electrical conductor and having a diameter that is slightly less than the internal diameter of said electrical conductor;
   b. sealing means between said piston and the internal surface of said electrical conductor, said sealing means conforming to the shape of said groove in said piston; and
   c. an opening into the hollow central portion of said electrical conductor, between said piston and an end of said electrical conductor, that allows movement of said dielectric fluid into and out of a portion of the hollow central portion of said electrical conductor.

11. An electrical bushing assembly of the type defined in claim 10 wherein the sealing means between said piston and the internal wall of said conductor is of the O-ring type and the groove around the external surface of said movable piston is circular and is of constant semi-circular cross section.

12. An electrical bushing of the type defined in claim 11 wherein a plane containing said groove around the external surface of said movable piston is orthogonal to the longitudinal axis of said movable piston.

13. An electrical bushing assembly of the type defined in claim 11 wherein said O-ring typed sealing means is made of resilient nitrile rubber.

14. An electrical bushing assembly of the type defined in claim 10 wherein said opening into the hollow central portion of said electrical conductor is circular in shape.

15. An electrical bushing assembly of the type defined in claim 14 wherein the longitudinal axis of said opening into the hollow central portion of said electrical conductor is orthogonal to the longitudinal axis of said electrical conductor.

* * * * *